United States Patent
Latrasse et al.

(10) Patent No.: US 10,823,988 B2
(45) Date of Patent: Nov. 3, 2020

(54) OPTICAL MODULATOR ROBUST TO FABRICATION ERRORS

(71) Applicant: Ciena Corporation, Hanover, MD (US)

(72) Inventors: Christine Latrasse, Québec (CA); Yves Painchaud, Québec (CA); Michel Poulin, Québec (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/609,069

(22) PCT Filed: Apr. 12, 2018

(86) PCT No.: PCT/US2018/027239
§ 371 (c)(1),
(2) Date: Oct. 28, 2019

(87) PCT Pub. No.: WO2018/200210
PCT Pub. Date: Nov. 1, 2018

(65) Prior Publication Data
US 2020/0057320 A1 Feb. 20, 2020

Related U.S. Application Data

(63) Continuation of application No. 15/582,050, filed on Apr. 28, 2017, now Pat. No. 10,330,961.

(51) Int. Cl.
*G02F 1/025* (2006.01)
*G02F 1/225* (2006.01)
*G02B 6/12* (2006.01)
*G02B 6/134* (2006.01)
(Continued)

(52) U.S. Cl.
CPC ............ *G02F 1/025* (2013.01); *G02F 1/2257* (2013.01); *G02B 6/12002* (2013.01); *G02B 6/134* (2013.01); *G02B 2006/12061* (2013.01); *G02B 2006/12142* (2013.01); *G02F 2001/0152* (2013.01); *G02F 2001/212* (2013.01)

(58) Field of Classification Search
None
See application file for complete search history.

(56) References Cited

U.S. PATENT DOCUMENTS

| | | |
|---|---|---|
| 9,841,618 B1 | 12/2017 | Poulin et al. |
| 2013/0343693 A1 | 12/2013 | Doerr |
| 2014/0112611 A1 | 4/2014 | Vermeulen et al. |

(Continued)

FOREIGN PATENT DOCUMENTS

GB    2348293 A    9/2000

OTHER PUBLICATIONS

Ning-Ning Feng et al., High speed carrier-depletion modulators with 1.4V-cm V-πL integrated on 0.25 μm silicon-on-insulator waveguides, 2010 Optical Society of America, Apr. 12, 2010/Vo. 18, No. 8/Optics Express 7994, pp. 1-6.

(Continued)

*Primary Examiner* — Jerry Rahll
(74) *Attorney, Agent, or Firm* — Clements Bernard Walker; Lawrence A. Baratta, Jr.; Christopher L. Bernard

(57) ABSTRACT

An optical modulator includes a first arm and a second arm, each arm includes an arrangement with an equal amount of p-doped material and an equal amount of n-doped material, such that mask misalignment causes a same effect in both arms; and each arm includes a plurality of segments where electrodes connect for push-pull operation of the first arm and the second arm.

20 Claims, 8 Drawing Sheets

(51) Int. Cl.
    *G02F 1/015* (2006.01)
    *G02F 1/21* (2006.01)

(56) References Cited

U.S. PATENT DOCUMENTS

2014/0341499 A1    11/2014    Manouvrier
2014/0355925 A1    12/2014    Manouvrier
2014/0376852 A1    12/2014    Manouvrier

OTHER PUBLICATIONS

Aug. 3, 2018, International Search Report and Written Opinion for International Application No. PCT/US2018/027239.

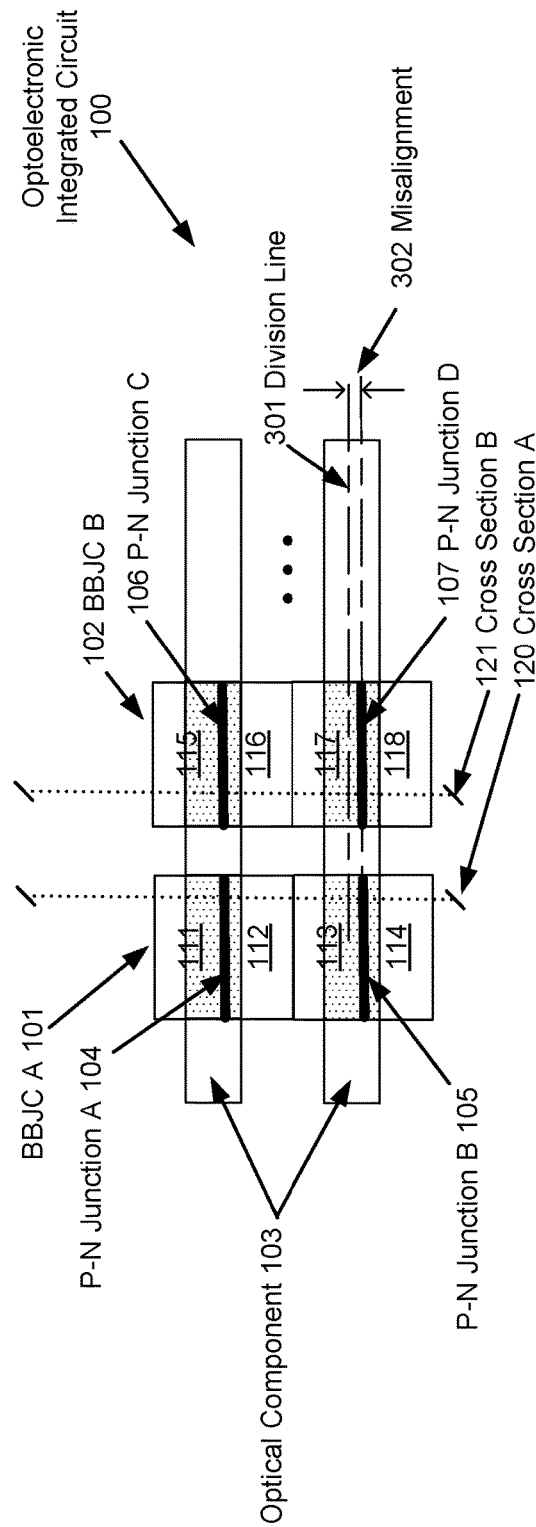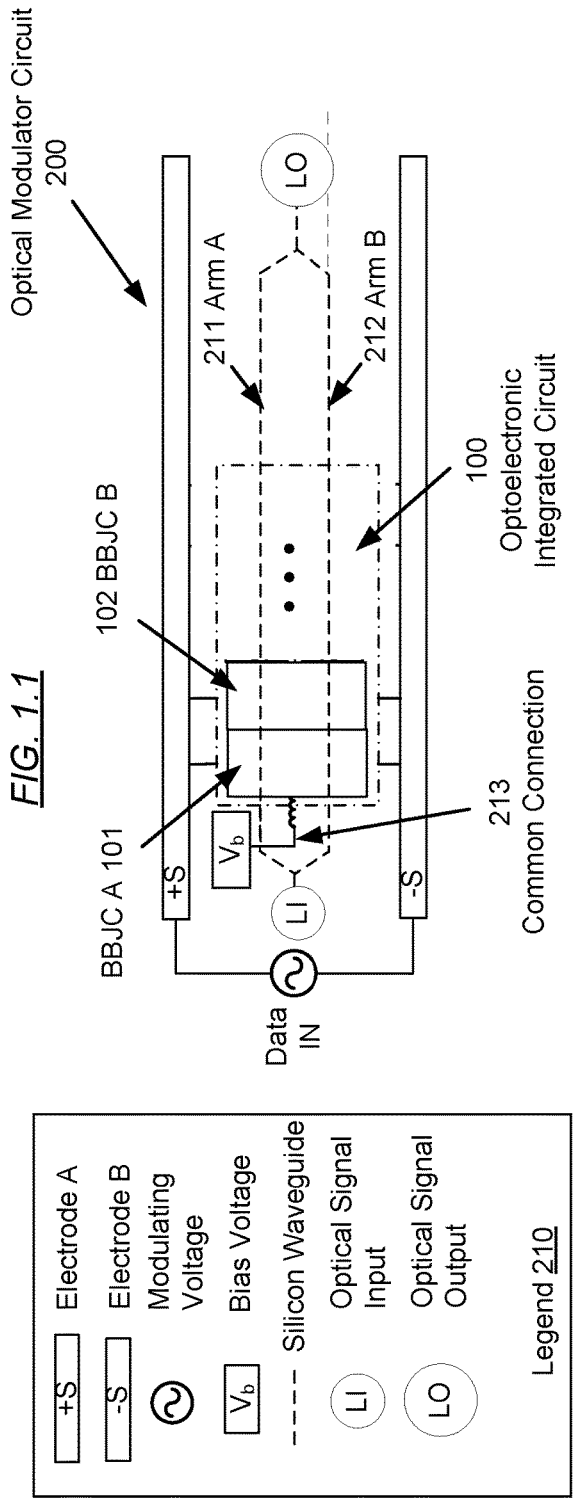

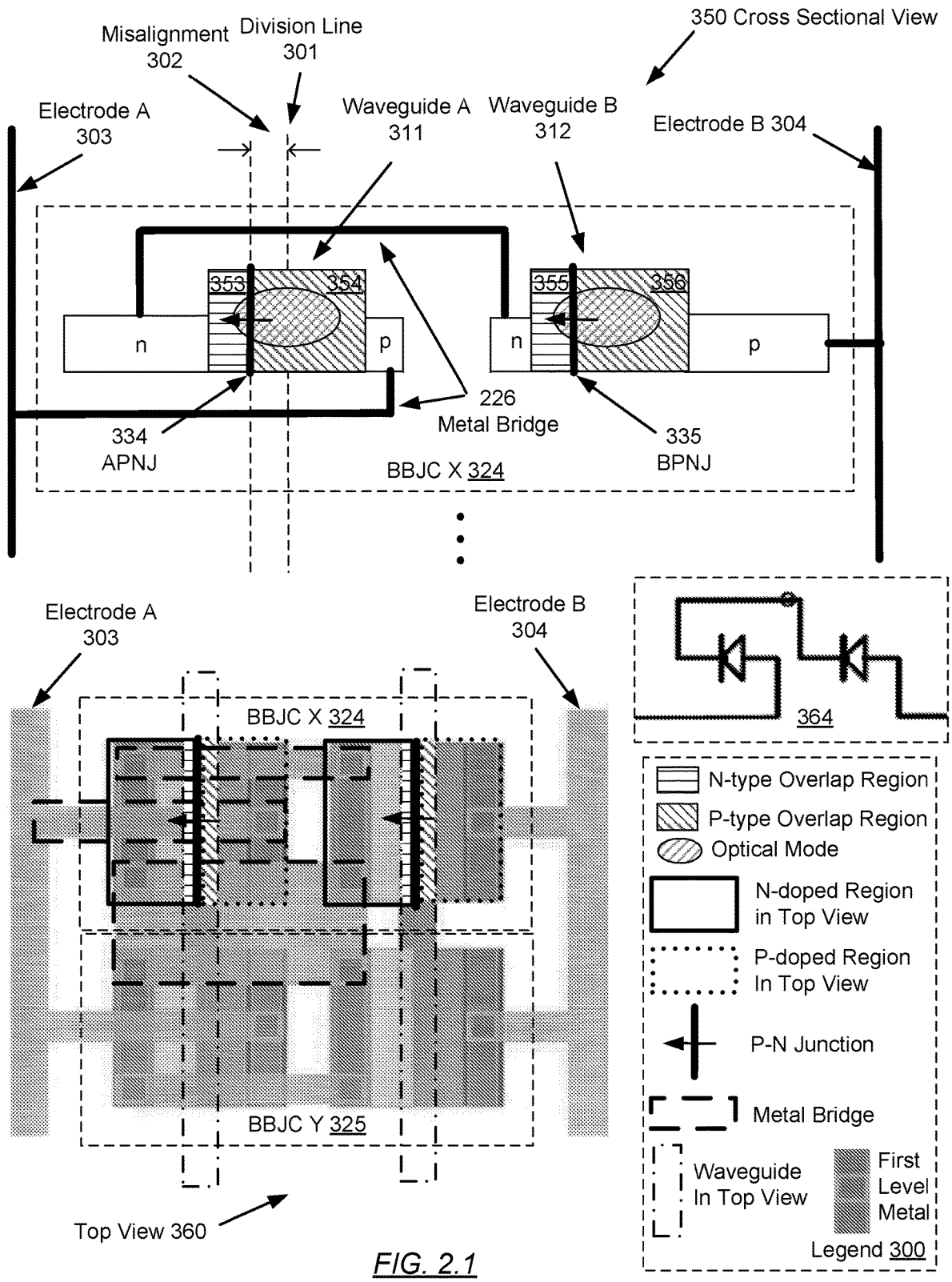
FIG. 2.1

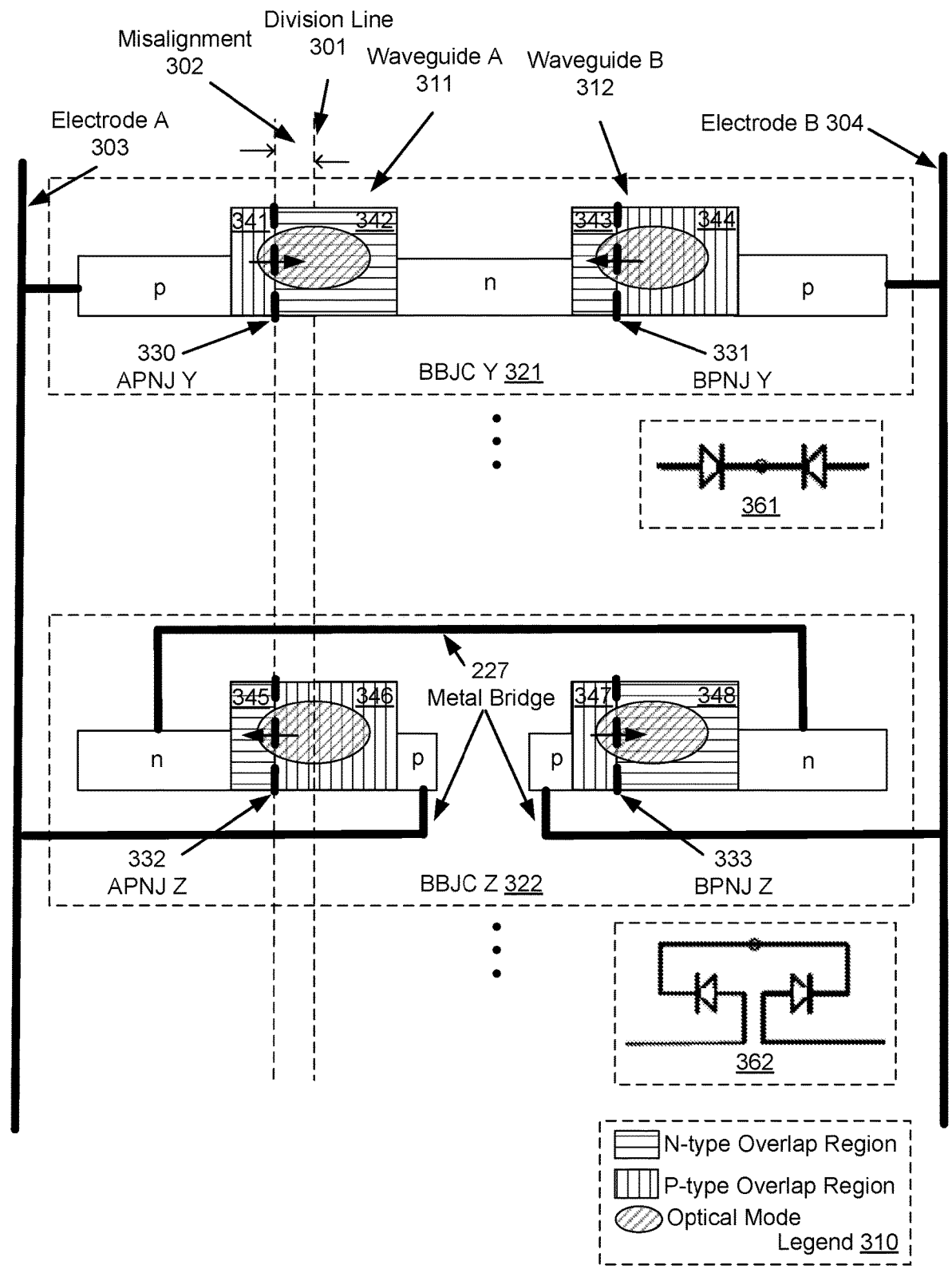
FIG. 2.2

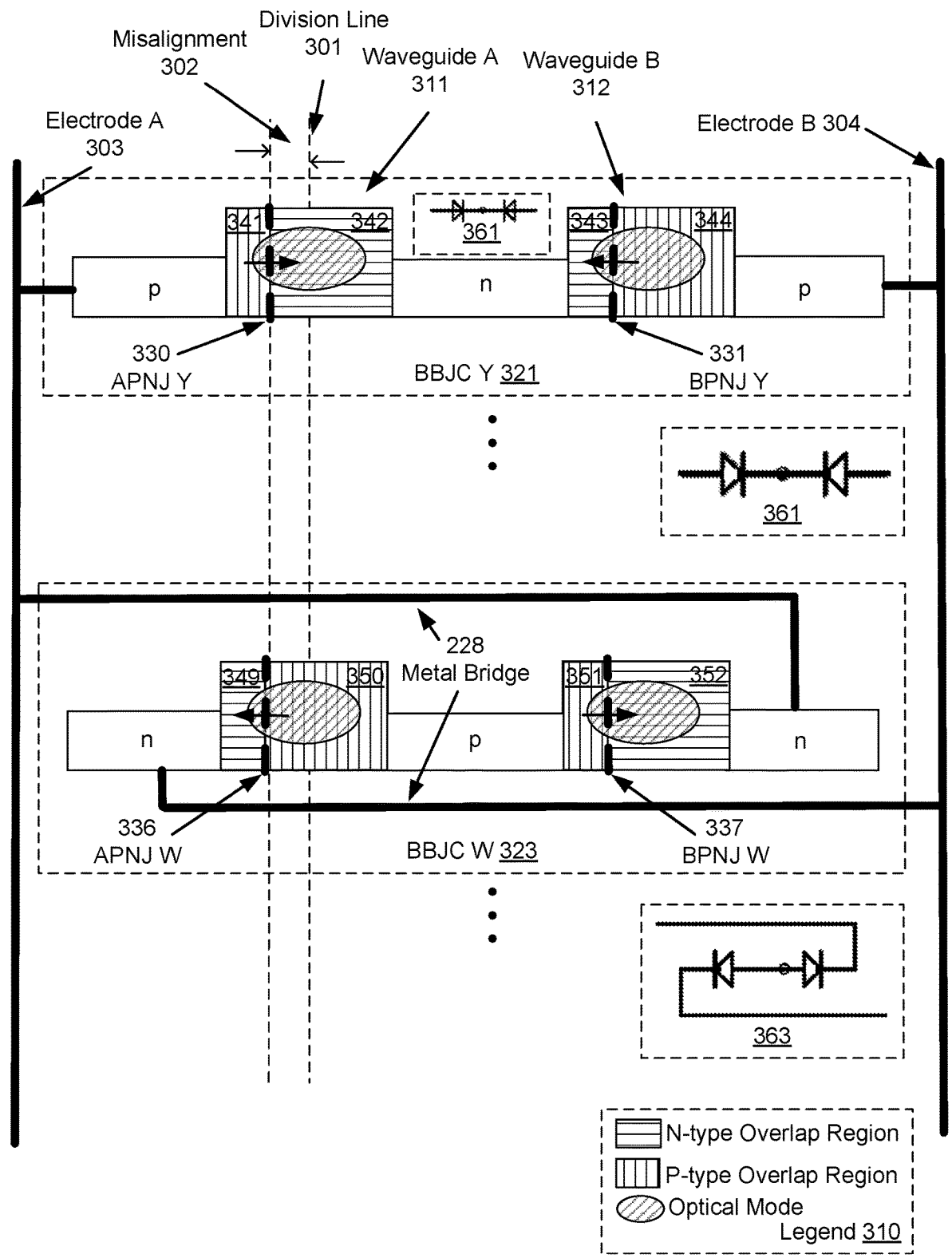
FIG. 2.3

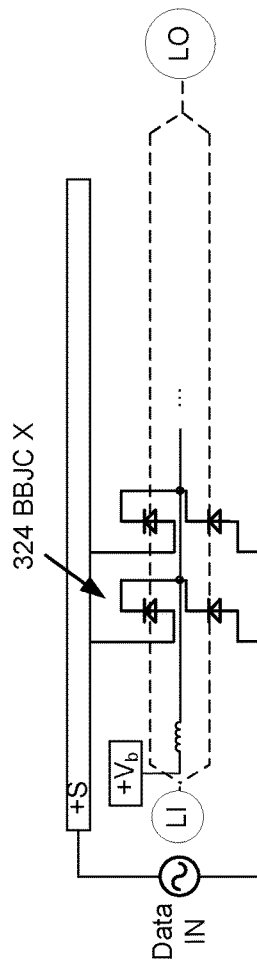
FIG. 4
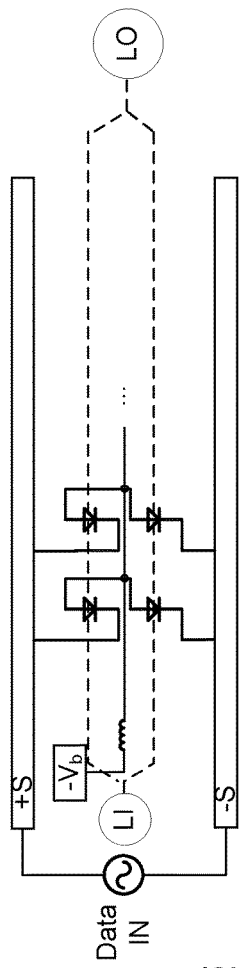
FIG. 5
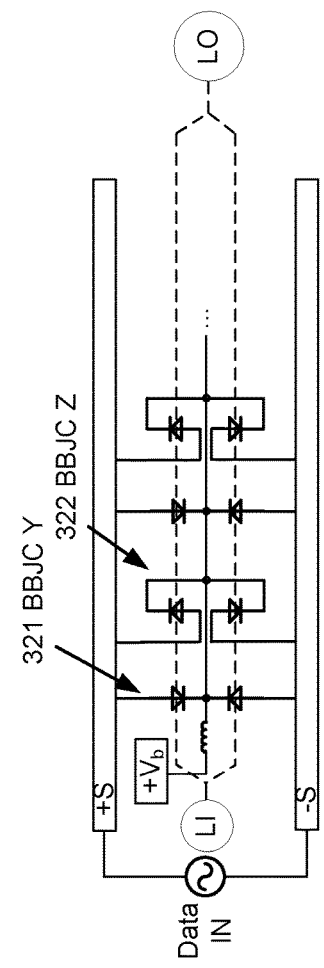
FIG. 6
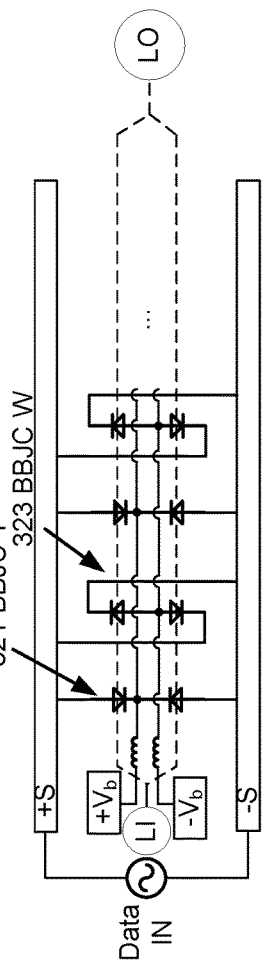
FIG. 7
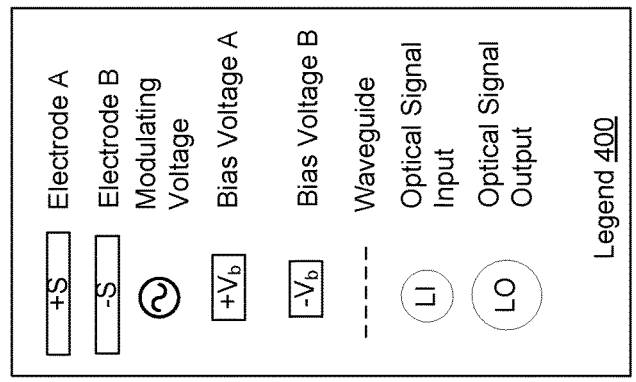

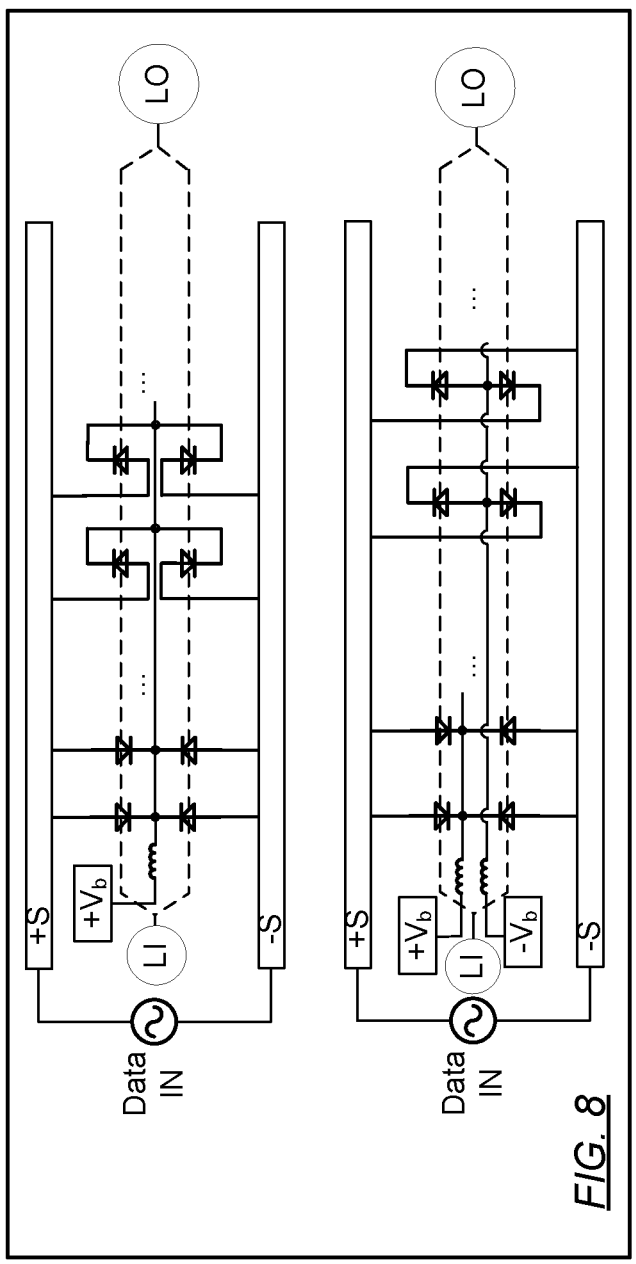
FIG. 8
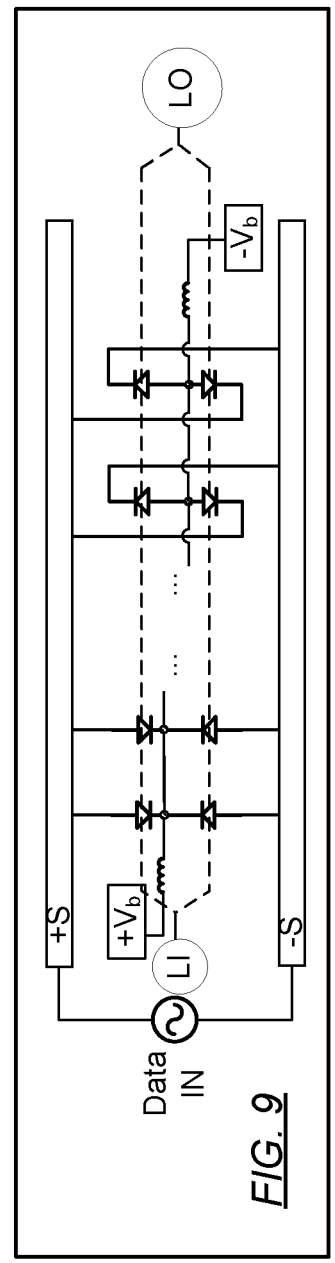
FIG. 9
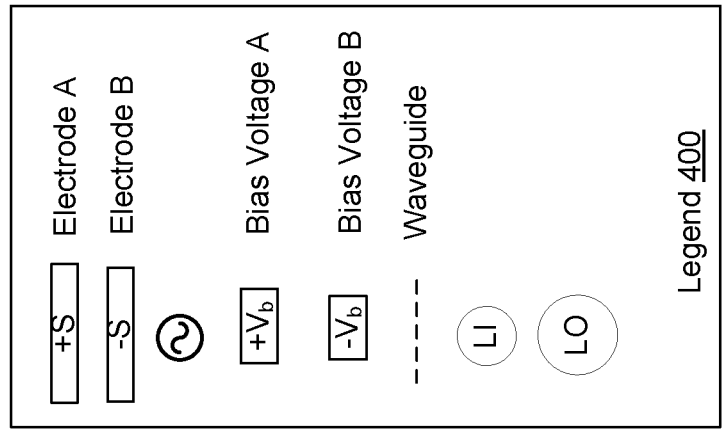
Legend 400

OPTICAL MODULATOR ROBUST TO FABRICATION ERRORS

CROSS-REFERENCE TO RELATED APPLICATION(S)

The present disclosure is a national stage application of PCT Patent Application No. PCT/US18/27239, filed on Apr. 12, 2018, which claims priority to U.S. patent application Ser. No. 15/582,050, filed Apr. 28, 2017, and now U.S. Pat. No. 10,330,961, issued Jun. 25, 2019.

BACKGROUND

An electronic component is a component that conducts, transmits, receives, generates, or otherwise uses an electrical current and/or signal during the operation of the component. An optoelectronic component is an electronic component that also uses an optical signal during operation. An optoelectronic integrated circuit is a set of optoelectronic components on one small flat piece referred to as a "chip", which is created from a batch fabrication process using a wafer. The wafer may include semiconductor material (e.g., silicon) overlaid with additional material layers (e.g., metal, oxide, etc.) to simultaneously fabricate a large number of the optoelectronic integrated circuits. Subsequent to the wafer fabrication, multiple optoelectronic integrated circuits are separated into chips for final packaging. The layout of the optoelectronic integrated circuit is the designed placement of planar geometric component shapes of the optoelectronic integrated circuit. A fabrication pattern of the optoelectronic integrated circuit is the pattern of semiconductor, oxide, metal, or other material layers formed on a wafer, die, and/or chip based on the layout. Misalignment is the shifting among layers in the fabrication pattern with respect to the layout.

A p-n junction is a boundary or interface between a p-type region and an n-type region of semiconductor material. The p-type region and the n-type region are created by selectively doping (e.g., via an ion implantation process, diffusion process, epitaxy process, etc.) the semiconductor material using a p-type dopant or an n-type dopant, respectively. The fabrication pattern of the p-type region and the n-type region is based on one or more lithography masks used to perform the selective doping.

A waveguide is an optoelectronic component having a physical structure that confines and guides the propagation of an electromagnetic (EM) wave, e.g., as an optical signal. A mode is an electromagnetic (EM) field pattern in the waveguide. The fabrication pattern of the waveguide corresponds to the physical structure and is based on one or more lithography masks used to form the physical structure.

SUMMARY

In general, in one aspect, the invention relates to an optoelectronic integrated circuit. The optoelectronic integrated circuit includes (i) a first back-to-back-junction component (BBJC) and a second BBJC that conform to a first fabrication pattern, where the first BBJC includes a first A-type p-n junction (APNJ) in series with a first B-type p-n junction (BPNJ), where the second BBJC includes a second APNJ in series with a second BPNJ, and (ii) an optical component conforming to a second fabrication pattern that superimposes the first fabrication pattern, where the optical component overlaps the first APNJ and the second APNJ to define a first p-type overlap region and a first n-type overlap region, where the optical component overlaps the first BPNJ and the second BPNJ to define a second p-type overlap region and a second n-type overlap region. The APNJs and BPNJs may be identified based on overlapping with separate arms of the optical component. The first APNJ, the first BPNJ, the second APNJ, and the second BPNJ are disposed along respective directions, where metal bridges may be used, such that (i) the first p-type overlap region and the second p-type region are substantially same size, independent of a fabrication misalignment amount of the first fabrication pattern with respect to the second fabrication pattern, and (ii) the first n-type overlap region and the second n-type region are substantially same size independent of the fabrication misalignment amount of the first fabrication pattern with respect to the second fabrication pattern.

In general, in one aspect, the invention relates to an optical modulator circuit. The optical modulator circuit includes (i) a first electrode and a second electrode that are adapted to propagate a modulating voltage of the optical modulator circuit, (ii) a first back-to-back-junction component (BBJC) and a second BBJC that are connected to the first electrode and the second electrode to receive the modulating voltage, where the first BBJC includes a first A-type p-n junction (APNJ) in series with a first B-type p-n junction (BPNJ), where the second BBJC includes a second APNJ in series with a second BPNJ, where the first BBJC and the second BBJC conform to a first fabrication pattern, and (iii) a first optical waveguide and a second optical waveguide that are adapted to propagate an optical signal of the optical modulator circuit, where the first optical waveguide and the second optical waveguide conform to a second fabrication pattern that superimposes the first fabrication pattern, where the first optical waveguide overlaps the first APNJ and the second APNJ to define a first p-type overlap region and a first n-type overlap region, where the second optical waveguide overlaps the first BPNJ and the second BPNJ to define a second p-type overlap region and a second n-type overlap region. The APNJs and BPNJs may be identified based on overlapping with the first optical waveguide and second optical waveguide. The first APNJ, the first BPNJ, the second APNJ, and the second BPNJ are disposed along respective directions, where metal bridges may be used, such that (i) the first p-type overlap region and the second p-type region are substantially same size, independent of a fabrication misalignment amount of the first fabrication pattern with respect to the second fabrication pattern, and (ii) the first n-type overlap region and the second n-type region are substantially same size independent of the fabrication misalignment amount of the first fabrication pattern with respect to the second fabrication pattern. The respective directions reduce an imbalance in the modulation of the optical signal using the modulating voltage from the first electrode and the second electrode.

In general, in one aspect, the invention relates to a method for fabricating an optoelectronic integrated circuit. The method includes (ii) forming a first back-to-back-junction component (BBJC) and a second BBJC according to a first fabrication pattern, where the first BBJC includes a first A-type p-n junction (APNJ) in series with a first B-type p-n junction (BPNJ), where the second BBJC includes a second APNJ in series with a second BPNJ, and (ii) forming an optical component according to a second fabrication pattern that superimposes the first fabrication pattern, where the optical component overlaps the first APNJ and the second APNJ to define a first p-type overlap region and a first n-type overlap region, where the optical component overlaps the first BPNJ and the second BPNJ to define a second p-type overlap region and a second n-type overlap region. The APNJs and BPNJs may be identified based on overlapping with separate arms of the optical component. The first APNJ, the first BPNJ, the second APNJ, and the second BPNJ are disposed along respective directions, where metal bridges may be used, such that (i) the first p-type overlap region and the second p-type region are substantially same size independent of a fabrication misalignment amount of the first fabrication pattern with respect to the second fabrication pattern, and (ii) the first n-type overlap region and the second n-type region are substantially same size independent of the fabrication misalignment amount of the first fabrication pattern with respect to the second fabrication pattern.

Other aspects of the invention will be apparent from the following description and the appended claims.

BRIEF DESCRIPTION OF THE DRAWINGS

FIGS. 1.1 and 1.2 show fabrication pattern diagrams in accordance with one or more embodiments of the invention.

FIGS. 2.1, 2.2, and 2.3 shows top view and side view diagrams in accordance with one or more embodiments of the invention.

FIGS. 4, 5, 6, 7, 8, 9, 10, and 11 show examples in accordance with one or more embodiments of the invention.

DETAILED DESCRIPTION

Figure 3:
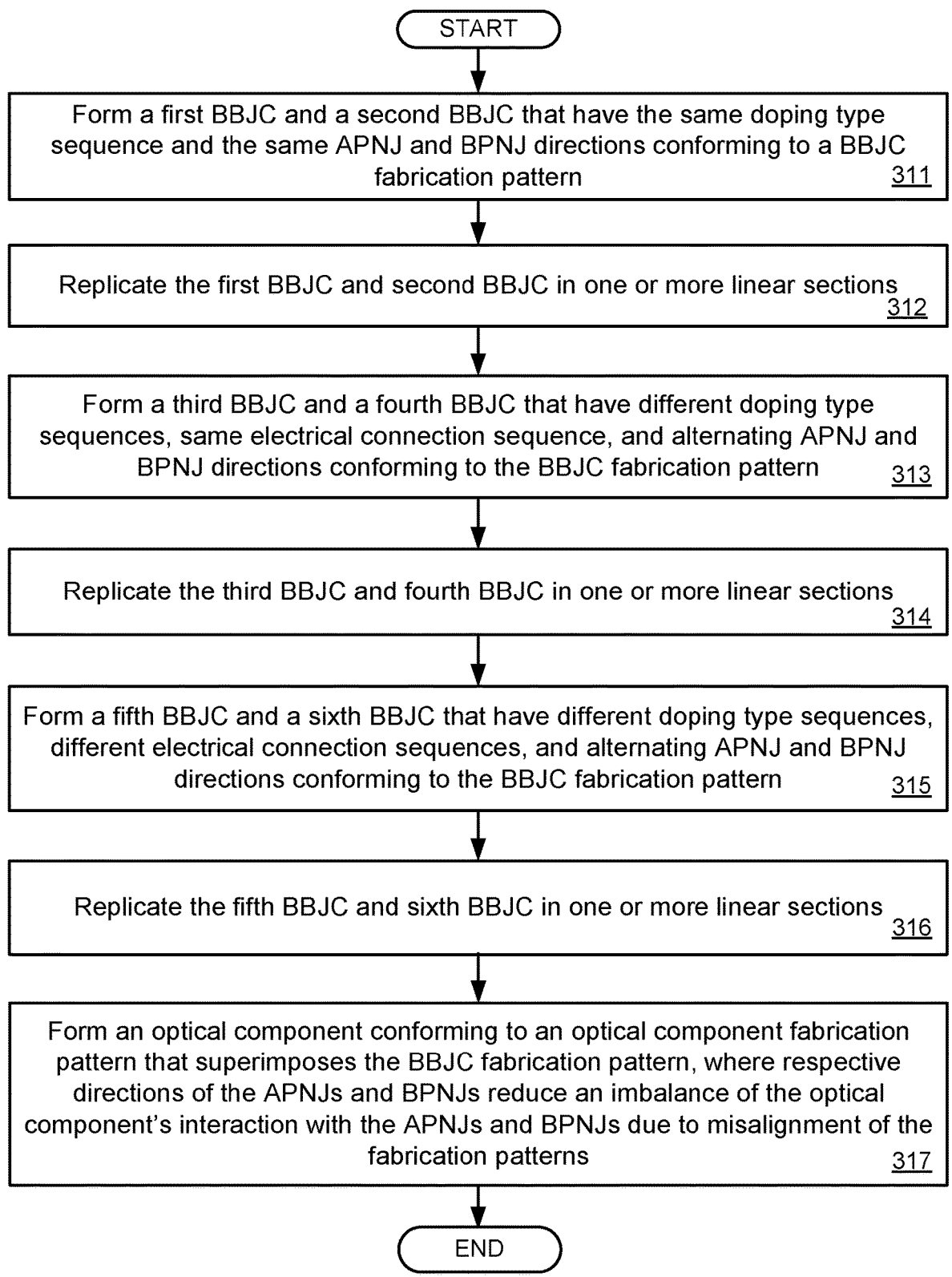
FIG. 3 shows a method flowchart in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, three black solid collinear dots indicate that additional components similar to the components before and after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide an optoelectronic integrated circuit having a group of back-to-back-junction components (BBJCs) overlapped by and aligned to an optical component. The BBJC are disposed in the optoelectronic integrated circuit according to a layout that reduces a misalignment effect with respect to the optical component. In one or more embodiments, the BBJC and the optical component form two arms of an optical modulator. The p-type and n-type regions of p-n junctions are geometrically swapped between the BBJC. For example, each arm of the optical modulator contains substantially the same number of (i) BBJCs having p-n junctions with p-type regions at one side of the optical component and (ii) BBJCs having p-n junctions with p-type regions at the opposite side of the optical component. Accordingly, misalignment of the BBJCs with respect to the optical component results in substantially the same effect in both arms to reduce the misalignment effect on the optical modulator.

FIG. 1.1 shows a fabrication pattern diagram of an optoelectronic integrated circuit (100) in accordance with one or more embodiments of the invention. Throughout this disclosure, the relative positions and directions of components depicted in a fabrication pattern diagram correspond to physical layout positions and directions on an integrated circuit chip or dice. In one or more embodiments of the invention, one or more of the elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the optoelectronic integrated circuit (100) includes a sequence of back-to-back junction components (BBJCs) (e.g., BBJC A (101), BBJC B (102), etc.) disposed in parallel and conforming to a BBJC fabrication pattern. As used herein, the BBJC fabrication pattern is the pattern of semiconductor, oxide, metal, or other material layers formed on the wafer, die, and/or chip based on the layout of the BBJC. Specifically, a BBJC is an electronic component having two p-n junctions electrically connected as either a pnnp component or a nppn component. In other words, the BBJC may have two different electrical connection sequences (i.e., pnnp sequence or nppn sequence). The BBJC of the pnnp sequence (i.e., a pnnp component) has the n-type regions of the two p-n junctions electrically connected together. The BBJC of the nppn sequence (i.e., a nppn component) has the p-type regions of the two p-n junctions electrically connected together.

While the electrical connection sequence of the BBJC refers to and is based on the electrical connection of the p-n junctions, the doping type sequence of a BBJC is a physical sequence of doping types (i.e., n-type or p-type) according to the layout of the BBJC's doped regions (i.e., n-type region and p-type region).

The BBJC A (101) includes a p-n junction A (104) in series with a p-n junction B (105) that are formed from a physical layout sequence of doped regions (111), (112), (113), and (114). The doping type sequence of the BBJC A (101) is a sequence x-y-z-w where x, y, z, and w denote the doping types (i.e., n-type or p-type) of the doped regions (111), (112), (113), and (114), respectively. In some embodiments, an intervening non-doped region may exist between the doped regions (112) and (113). Similarly, the BBJC B (102) includes a p-n junction C (106) in series with a p-n junction D (107) that are formed from a physical layout sequence of doped regions (115), (116), (117), and (118). The doping type sequence of the BBJC B (102) is a sequence q-p-r-s where q, p, r, and s denote the doping types (i.e., n-type or p-type) of the doped regions (115), (116), (117), and (118), respectively. In some embodiments, an intervening non-doped region may exist between the doped regions (116) and (117). For example, the doping type sequence of the BBJC A (101) and/or BBJC B (102) may be n-p-n-p, p-n-p-n, n-p-p-n, p-n-p-n.

In one or more embodiments, the doped regions (111), (112), (113), (114), (115), (116), (117), and (118) are electrically interconnected (not explicitly shown) via contiguous same-type doped regions and/or via metal bridges to form respective pnnp or nppn component. In particular, the doping type sequence and the electrical connection sequence relate to the fabrication pattern of the BBJC A (101) and the BBJC B (102) (more particularly, of the doped regions (111), (112), (113), (114), (115), (116), (117), and (118)), which is based on one or more lithographic masks used to perform the selective doping for the BBJC A (101) and the BBJC B (102). Various doping type sequences and electrical connection sequences of the doped regions (111), (112), (113), (114), (115), (116), (117), and (118) are described in reference to FIGS. 2.1-2.3 below.

Further, as shown in FIG. 1.1, the optoelectronic integrated circuit (100) includes an optical component (103) that conforms to an optical component fabrication pattern. As used herein, the optical component fabrication pattern is the pattern of semiconductor, oxide, metal, or other material layers formed on the wafer, die, and/or chip based on the layout of the optical component. In particular, the fabrication pattern of the optical component (103) superimposes the fabrication pattern of the BBJC A (101) and the BBJC B (102). The two fabrication patterns have a misalignment (302) with respect to a division line (301) of the optical component (103). In particular, the p-n junction B (105) and p-n junction D (107) are designed to coincide with the division line (301) according to the layout of the optoelectronic integrated circuit (100). For example, the division line (301) may be specified by a circuit designer in the layout of the optoelectronic integrated circuit (100) to divide the optical component (103) into portions overlapped by doping regions of the opposite types. During fabrication, the misalignment (302) results from a shifting between the aforementioned lithographic masks.

Depending on which side an overlap region is with respect to the misalignment (302) or the misaligned p-n junction, the misalignment (302) causes the overlap of the optical component (103) and the doped regions to have different sizes than what is specified by the circuit designer. For example, the optical component (103) (or the fabrication pattern thereof) overlaps the doped regions (111) and (112) (or the fabrication pattern thereof) to define two different-size and opposite-type overlap regions (highlighted) separated by the p-n junction A (104). Similarly, the optical component (103) (or the fabrication pattern thereof) overlaps the doped regions (113) and (114) (or the fabrication pattern thereof) to define two different-size and opposite-type overlap regions (highlighted) separated by the p-n junction B (105). The different-size and opposite-type overlap regions in the BBJC A (101) may result in an overlap region size imbalance between the two p-n junctions (i.e., p-n junction A (104), p-n junction B (105)) for either the p-type region or the n-type region. The overlap regions of the BBJC B (102) may also result in another overlap region size imbalances as the BBJC A (101).

In one or more embodiments, the p-n junction A (104), p-n junction B (105), p-n junction C (106), and p-n junction D (107) are disposed along respective directions such that (i) the combined p-type overlap region of the p-n junction A (104) and p-n junction C (106) has a substantially same size as the combined p-type overlap region of the p-n junction B (105) and p-n junction D (107) independent of the misalignment (302), and (ii) the combined n-type overlap region of the p-n junction A (104) and p-n junction C (106) has a substantially same size as the combined n-type overlap region of the p-n junction B (105) and p-n junction D (107) independent of the misalignment (302). As used herein, a direction of a p-n junction is the geometric direction from the p-type region to the n-type region according to the layout of the doped regions.

In one or more embodiments, the optical component (103) includes two sections, referred to as an arm A and an arm B. For example, one section overlaps the p-n junction A (104) and p-n junction C (106) while another section overlaps the p-n junction B (105) and p-n junction D (107). In this context, the p-n junction A (104) and p-n junction C (106) are referred to as A-type p-n junctions (APNJs) while the p-n junction B (105) and p-n junction D (107) are referred to B-type p-n junctions (BPNJs). In other words, the APNJ is an p-n junction overlapped by the arm A while the BPNJ is an p-n junction overlapped by the arm B. Specifically, the p-n junction A (104) and p-n junction C (106) form a first group (i.e., A-type) of p-n junctions while the p-n junction B (105) and p-n junction D (107) form a second group (i.e., B-type) of p-n junctions.

Various directions of the p-n junction A (104), p-n junction B (105), p-n junction C (106), and p-n junction D (107) to reduce the effect of misalignment induced overlap region size imbalance, in particular along the cross section A (120) and cross section B (121), are described in reference to FIGS. 2.1-2.3 below.

FIG. 1.2 shows a fabrication pattern diagram of an optical modulator circuit (200) in accordance with one or more embodiments of the invention. In one or more embodiments of the invention, one or more of the elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the optical modulator circuit (200) is an integrated circuit that is a superset of the optoelectronic integrated circuit (100) with additional components denoted according to the legend (210). Although not explicitly shown, in one or more embodiments, a radio frequency (RF) termination is connected to the electrodes on the opposite end from the bias voltages. Specifically, a common connection (213) to all p-n junctions of the BBJCs (e.g., BBJC A (101), BBJC B (102), etc.)) is adapted to receive a bias voltage for setting up depletion regions of the p-n junctions. The two ends of each BBJC (e.g., BBJC A (101), BBJC B (102), etc.)) are connected to an electrode A and electrode B, respectively, that are adapted to receive a modulating voltage. In particular, p-n junctions that overlap an arm A (211) of the silicon waveguide are APNJs. Similarly, p-n junctions that overlap an arm B (212) of the silicon waveguide are BPNJs. The arm A (211) and arm B (212) correspond to the two sections of the optical component (103) depicted in FIG. 1.1 above. Specific connections from the APNJs and BPNJs to the electrode A and electrode B are not explicitly shown in FIG. 1.2. Various electrode connection configurations for the APNJs and BPNJs are described in reference to FIGS. 2.1-11 below. The modulating voltage corresponds to input data (i.e., Data IN) which modulates the depletion region widths of the APNJs and BPNJs. The free carrier density in the p-n junctions being modulated translates into a modulation of the refractive index of the p-n junctions and to a phase modulation of an optical signal propagating from LI to LO along the arm A (211) and arm B (212) of the silicon waveguide. By merging the arm A (211) and arm B (212) in an interferometer configuration, the optical signal output (i.e., LO) is encoded with information from the input data (i.e., Data IN).

As noted above, the p-n junctions in the APNJs and BPNJs are disposed in respective directions to reduce the effect of misalignment induced overlap region size imbalance in the optoelectronic integrated circuit (100) and an imbalance in the modulation efficiency between the first group (i.e., A-type) and second group (i.e., B-type) of p-n junctions (i.e., APNJs and BPNJs). For a balanced operation of the optical modulator circuit (200), the combined p-type overlap region of the first group p-n junctions (i.e., APNJs) has a substantially same size as the combined p-type overlap region of the second group p-n junctions (i.e., BPNJs) independent of the misalignment (302). In addition, the combined n-type overlap region of the first group p-n junctions (i.e., APNJs) has a substantially same size as the combined n-type overlap region of the second group p-n junctions (i.e., BPNJs) independent of the misalignment (302). In other words, the respective directions of the first group and second group p-n junctions (i.e., APNJs and BPNJs) are designated in the layout of the optical modulator circuit (200) to reduce the misalignment induced imbalance resulting from modulating the optical signal using the modulating voltage from the electrode A and electrode B.

In one or more embodiments, the optical modulator circuit (200) is fabricated in silicon as a Mach-Zehnder (MZ) modulator used for light modulation in optical telecommunication applications. Unlike lithium niobate or other material that have electro-optic properties suitable for optical signal modulation, modulation in silicon waveguides is achieved based on the dependency of the refractive index to the free carrier density in the depletion region. Accordingly, by constructing a p-n junction within an optical waveguide and by applying a time-varying reverse voltage, the depletion region of the p-n junction (in particular, the free carrier density) may be modulated, leading to a modulation of the refractive index. In one or more embodiments, the direct current (DC) portion of the time-varying reverse voltage is supplied by the bias voltage while the alternating current (AC) portion of the time-varying reverse voltage is supplied by the modulating voltage.

In the MZ modulator, the presence of free carriers decreases the refractive index for both electrons and holes. The p-n junction is located in the silicon waveguide and modulation of the depletion width of this p-n junction affects an overlapping portion of the optical mode propagating in the waveguide. Accurate positions of the p-n junction within the optical waveguide improves the modulation performance. P-type and n-type dopants are implanted at proper locations defined by lithographic masks aligned over the already defined waveguides. For example, the alignment, performed over multiple optoelectronic integrated circuits of the entire wafer, may have an accuracy of approximately 50 nm (nanometer) while the waveguide may have a width of approximately 400 to 500 nm. Compared to the width of the waveguide, the alignment error may not be negligible and may therefore cause a significant variation in the modulation efficiency across the wafer.

As an example, each arm of the MZ modulator (e.g., arm A (211), arm B (212)) with the associated electrode may be several mm (millimeter) long to produce the designed phase modulation amplitude. For operation at high frequency (i.e. 10's of GHz (giga-hertz)), the MZ modulator arms are implemented using radio frequency (RF) traveling-wave electrodes acting as RF transmission lines. The traveling-wave RF electrodes are elongated electrodes connected to p-n junctions for transmitting the modulation voltage(s). By way of this connection, the capacitance of the p-n junctions adds to the capacitance of the elongated electrodes, which is referred to as the capacitance loading. The capacitance loading results in a characteristic impedance matching with respect to the input driver circuit. In addition, the capacitance loading results in a group velocity matching with respect to the optical waves propagating in the optical waveguides.

As shown in FIG. 1.2, the p-n junctions of the MZ modulator may be divided in segments that connect periodically (or at specific locations) to the RF traveling-wave electrodes to receive the modulation voltage from the input driver circuit. In other words, the RF traveling-wave electrodes propagate the input data (i.e., Data IN) as RF traveling-wave to each p-n junction segment (i.e., one or more BBJCs) along the length of the MZ modulator arms. In particular, the RF traveling-wave is propagated along the length of the arms in a push-pull operation where the phase changes of the optical signal in both arms are in opposite directions. The push-pull operation reduces frequency chirp in the optical signal output (i.e., LO) of the MZ modulator. In one or more embodiments, a single input driver circuit is advantageously used to drive input data (i.e., Data IN) to both arms connected by BBJCs. In particular, the p-n junctions of the two MZ modulator arms are connected back-to-back (i.e., with the p (or n) side of the two diodes electrically connected together) in the SPP configuration. This circuit configuration is a series-push-pull (SPP) configuration.

FIGS. 2.1-2.3 show top view and side view diagrams in accordance with one or more embodiments of the invention. In the side view diagrams, the semiconductor material layers (i.e., waveguides and doping regions) are shown in two-dimensional cross sections while the conducting layers (i.e., metal bridges and electrodes) are shown schematically as line segments. In particular, the line segments represent electrical connection but not physical layout. The top view and side view diagrams correspond to the fabrication pattern of the optoelectronic integrated circuit (100) and optical modulator circuit depicted in FIGS. 1.1 and 1.2 above. In particular, the side view diagrams illustrate various combinations of doping type sequences, electrical connection sequences, and p-n junction directions to reduce the effect of misalignment induced overlap region size imbalance, in particular along the cross section A (120) and cross section B (121) depicted in FIG. 1.1 above.

FIG. 2.1 shows a side view (350) and a top view (360) of a BBJC X (324) according to the legend (300). In one or more embodiments of the invention, the BBJC X (324) corresponds to both the BBJC A (101) and BBJC B (102) (depicted in FIGS. 1.1. and 1.2 above) that have the same doping type sequence. Accordingly, the side view (350) corresponds to both the cross section A (120) and the cross section B (121) depicted in FIG. 1.1 above.

As shown in FIG. 2.1, the BBJC X (324) has the doping type sequence n-p-n-p to form the APNJ (334) and BPNJ (335). In particular, the APNJ (334) and BPNJ (335) have the same p-n junction direction denoted by the arrows of the p-n junction icons. The APNJ (334) and BPNJ (335) are electrically connected into a pnnp component (364) via the metal bridge (226). In other words, the metal bridge (226) is used to form a pnnp electrical connection sequence. Correspondingly in FIGS. 1.1 and 1.2, the BBJC A (101) and BBJC B (102) have the same pnnp electrical connection sequence and have the same n-p-n-p doping type sequence. In addition, the p-n junction A (104), p-n junction B (105), p-n junction C (106), and p-n junction D (107) are all disposed in the same direction.

Further as shown in FIG. 2.1, the electrode A (303), electrode B (304), waveguide A (311), waveguide B (312), division line (301), and misalignment (302) correspond respectively to the electrode A, electrode B, arm A (211), arm B (212), division line (301), and misalignment (302) depicted in FIG. 1.1 above. In addition, the n-type overlap region (353) and p-type overlap region (354) correspond to the two different-size and opposite-type overlap regions separated by the p-n junction A (104), as depicted in FIG. 1.1 above. Similarly, the n-type overlap region (355) and p-type overlap region (356) correspond to the two different-size and opposite-type overlap regions separated by the p-n junction B (105), as depicted in FIG. 1.1 above. The different-size overlap regions merely result in the optical mode interacting with a larger portion of p-type material than n-type material on both the waveguide A (311) and waveguide B (312). Independent of the different-size overlap regions, the optical mode still interacts with substantially same amount (e.g., within 10% or other pre-determined amount) of p-type material on both the waveguide A (311) and the waveguide B (312), as well as interacts with substantially same amount (e.g., within 10% or other pre-determined amount) of n-type material on both the waveguide A (311) and the waveguide B (312). Accordingly, the same directions of the APNJs and BPNJs (i.e., p-n junction A (104), p-n junction B (105), p-n junction C (106), p-n junction D (107)) reduce the imbalance of the modulation strength incurred in optical arms A and B.

The top view (360) shows a SPP configuration in which each segment (e.g., BBJC X (324), BBJC Y (325), etc.) contains a pnnp component with each p-doped region on the same side of the overlapped waveguide, and with each n-doped region on the other same side of the overlapped waveguide, for both MZ modulator arms. The BBJC X (324) is highlighted in the top view (360) according to the legend (300). The BBJC Y (325) and BBJC X (324) are mirror image to each other (with respect to an adjoining boundary) in the top view (360) and both have the same cross section view (350). As noted above, the impact of a misalignment of the doped regions is substantially the same (e.g., within 10% or other pre-determined amount) for both MZ modulator arms. According to the legend (300), two levels of metal are used to fabricate the BBJC X (324). Specifically, the first level metal is used to electrically contact the doped regions (using a set of appropriate vias) while the second level metal is used to form the electrode A (303) and electrode B (304). The metal bridges may be formed in one or more of the metal layers using another set of appropriate vias.

Although the description of FIG. 2.1 applied to FIG. 1.1 above is based on a single doping sequence n-p-n-p for both the BBJC A (101) and BBJC B (102), the optoelectronic integrated circuit (100) may also be based on the BBJC A (101) and BBJC B (102) having the same doping type sequence p-n-p-n. Further, although the misalignment (302) represents same amount of misalignments for both the p-type and n-type regions, the p-type region and the n-type region may have a different amount of misalignment.

FIG. 2.2 shows a side view of a BBJC Y (321) and a BBJC Z (322) according to the legend (310). In one or more embodiments of the invention, the BBJC Y (321) and BBJC Z (322) correspond to the BBJC A (101) and BBJC B (102), respectively, depicted in FIGS. 1.1. and 1.2 above. Accordingly, the BBJC Y (321) and BBJC Z (322) correspond to the cross section A (120) and the cross section B (121), respectively, depicted in FIG. 1.1 above. In particular, the BBJC Y (321) and BBJC Z (322), thus the BBJC A (101) and BBJC B (102), have different and opposite doping type sequences p-n-n-p and n-p-p-n. Accordingly, the APNJ Y (330) and BPNJ Z (333) are disposed in the same direction, while APNJ Z (332) and BPNJ Y (331) are disposed in the same direction opposite to the direction of the APNJ Y (330) and BPNJ Z (333).

As shown in FIG. 2.2, the APNJ Y (330) and BPNJ Y (331) have opposite p-n junction directions denoted by the arrows of the p-n junction icons. The APNJ Y (330) and BPNJ Y (331) are electrically connected into a pnnp component (361) via the contiguous n-type doped region. In other words, the contiguous n-type doped region is used to form a pnnp electrical connection sequence. Further, the APNJ Z (332) and BPNJ Z (333) also have opposite p-n junction directions denoted by the arrows of the p-n junction icons. The APNJ Z (332) and BPNJ Z (333) are electrically connected into a pnnp component (362) via the metal bridges (227). In other words, the metal bridges (227) is used to form a pnnp electrical connection sequence. Correspondingly in FIGS. 1.1 and 1.2, the BBJC A (101) and BBJC B (102) have the same pnnp electrical connection sequence but have the different and opposite doping type sequences p-n-n-p and n-p-p-n, respectively. In addition, the p-n junction A (104) and p-n junction D (107) are disposed in the same direction, while the p-n junction B (105) and p-n junction C (106) are disposed in the same direction opposite to the direction of the p-n junction A (104) and p-n junction D (107).

Further as shown in FIG. 2.2, the electrode A (303), electrode B (304), waveguide A (311), waveguide B (312), division line (301), and misalignment (302) respectively correspond to the electrode A, electrode B, arm A (211), arm B (212), division line (301), and misalignment (302) depicted in FIG. 1.2 above. Further, the n-type overlap region (342) and p-type overlap region (341) correspond to the two different-size and opposite-type overlap regions separated by the p-n junction A (104), as depicted in FIG. 1.1 above. Similarly, the n-type overlap region (343) and p-type overlap region (344) correspond to the two different-size and opposite-type overlap regions separated by the p-n junction B (105), as depicted in FIG. 1.1 above. In addition, the n-type overlap region (345) and p-type overlap region (346) correspond to the two different-size and opposite-type overlap regions separated by the p-n junction C (106), as depicted in FIG. 1.1 above. Similarly, the n-type overlap region (348) and p-type overlap region (347) correspond to the two different-size and opposite-type overlap regions separated by the p-n junction D (107), as depicted in FIG. 1.1 above.

In the waveguide A (311), the optical mode interacts with a combination of p-type region (341) and p-type region (346). In the waveguide B (312), the optical mode interacts with a combination of p-type region (344) and p-type region (347). Independent of the misalignment (302), the combination of p-type overlap region (341) and p-type overlap region (346) is substantially the same size (e.g., within 10% or other pre-determined amount) as the combination of p-type overlap region (344) and p-type overlap region (347). In other words, the optical mode interacts with same amount (e.g., within 10% or other pre-determined amount) of p-type material on both the waveguide A (311) and waveguide B (312).

In the waveguide A (311), the optical mode interacts with a combination of n-type region (342) and n-type region (345). In the waveguide B (312), the optical mode interacts with a combination of n-type region (343) and n-type region (348). Independent of the misalignment (302), the combination of n-type overlap region (342) and n-type overlap region (345) is substantially the same size (e.g., within 10% or other pre-determined amount) as the combination of n-type overlap region (343) and n-type overlap region (348). In other words, the optical mode interacts with same amount (e.g., within 10% or other pre-determined amount) of n-type material on both the waveguide A (311) and waveguide B (312).

Accordingly, the combination of doping type sequences, electrical connection sequences, and p-n junction directions of the APNJs and BPNJs reduces the imbalance of the modulation strength incurred in optical arms A and B.

Although the description of FIG. 2.2 is based on the doping sequences p-n-n-p and n-p-p-n for the BBJC Y (321) and BBJC Z (322), respectively, the balanced operation of the optoelectronic integrated circuit may also be based on the BBJC Y (321) and BBJC Z (322) having the doping type sequences n-p-p-n and p-n-n-p, respectively. Further, although the misalignment (302) represents same amount of misalignments for both the p-type and n-type regions, the p-type region and the n-type region may have a different amount of misalignment.

FIG. 2.3 shows a side view of a BBJC Y (321) and a BBJC W (323) according to the legend (310). In one or more embodiments of the invention, the BBJC Y (321) and BBJC W (323) correspond to the BBJC A (101) and BBJC B (102), respectively, depicted in FIGS. 1.1. and 1.2 above. Accordingly, the BBJC Y (321) and BBJC W (323) correspond to the cross section A (120) and the cross section B (121), respectively, depicted in FIG. 1.1 above. In particular, the BBJC Y (321) and BBJC W (323), thus the BBJC A (101) and BBJC B (102), have different and opposite doping type sequences p-n-n-p and n-p-p-n. Accordingly, the APNJ Y (330) and BPNJ W (337) are disposed in the same direction, while APNJ W (336) and BPNJ Y (331) are disposed in the same direction opposite to the direction of the APNJ Y (330) and BPNJ W (337).

As shown in FIG. 2.3, the APNJ Y (330) and BPNJ Y (331) have opposite p-n junction directions denoted by the arrows of the p-n junction icons. The APNJ Y (330) and BPNJ Y (331) are electrically connected into a pnnp component (361) via the contiguous n-type doped region. In other words, the contiguous n-type doped region is used to form a pnnp electrical connection sequence. Further, the APNJ W (336) and BPNJ W (337) also have opposite p-n junction directions denoted by the arrows of the p-n junction icons. The APNJ W (336) and BPNJ W (337) are electrically connected into a nppn component (363) via the contiguous p-type doped region. In other words, the contiguous p-type doped region is used to form a nppn electrical connection sequence. The metal bridge (228) connects respective n-type doped regions of the nppn component (363) to the electrode A (303) and electrode B (304). Correspondingly in FIGS. 1.1 and 1.2, the BBJC A (101) and BBJC B (102) have different and opposite electrical connection sequences and have the different and opposite doping type sequences. In addition, the p-n junction A (104) and p-n junction D (107) are disposed in the same direction, while the p-n junction B (105) and p-n junction C (106) are disposed in the same direction opposite to the direction of the p-n junction A (104) and p-n junction D (107).

Further, as shown in FIG. 2.3, the electrode A (303), electrode B (304), waveguide A (311), waveguide B (312), division line (301), and misalignment (302) respectively correspond to the electrode A, electrode B, arm A (211), arm B (212), division line (301), and misalignment (302) depicted in FIG. 1.2 above. Further, the n-type overlap region (342) and p-type overlap region (341) correspond to the two different-size and opposite-type overlap regions separated by the p-n junction A (104), as depicted in FIG. 1.1 above. Similarly, the n-type overlap region (343) and p-type overlap region (344) correspond to the two different-size and opposite-type overlap regions separated by the p-n junction B (105), as depicted in FIG. 1.1 above. In addition, the n-type overlap region (349) and p-type overlap region (350) correspond to the two different-size and opposite-type overlap regions separated by the p-n junction C (106), as depicted in FIG. 1.1 above. Similarly, the n-type overlap region (352) and p-type overlap region (351) correspond to the two different-size and opposite-type overlap regions separated by the p-n junction D (107), as depicted in FIG. 1.1 above.

In the waveguide A (311), the optical mode interacts with a combination of p-type overlap region (341) and p-type overlap region (350). In the waveguide B (312), the optical mode interacts with a combination of p-type overlap region (344) and p-type overlap region (351). Independent of the misalignment (302), the combination of p-type overlap region (341) and p-type overlap region (350) is substantially the same size (e.g., within 10% or other pre-determined amount) as the combination of p-type overlap region (344) and p-type overlap region (351). In other words, the optical mode interacts with same amount (e.g., within 10% or other pre-determined amount) of p-type material on both the waveguide A (311) and waveguide B (312).

In the waveguide A (311), the optical mode interacts with a combination of n-type overlap region (342) and n-type overlap region (349). In the waveguide B (312), the optical mode interacts with a combination of n-type overlap region (343) and n-type overlap region (352). Independent of the misalignment (302), the combination of n-type overlap region (342) and n-type overlap region (349) is substantially the same size (e.g., within 10% or other pre-determined amount) as the combination of n-type overlap region (343) and n-type overlap region (352). In other words, the optical mode interacts with same amount (e.g., within 10% or other pre-determined amount) of n-type material on both the waveguide A (311) and waveguide B (312).

Accordingly, the combination of doping type sequences, electrical connection sequences, and p-n junction directions of the APNJs and BPNJs reduce the imbalance of the modulation strength incurred in optical arms A and B.

Although the description of FIG. 2.3 is based on the doping sequences p-n-n-p and n-p-p-n for the BBJC Y (321) and BBJC W (323), respectively, the balanced operation of the optoelectronic integrated circuit may also be based on the BBJC Y (321) and BBJC W (323) having the doping type sequences n-p-p-n and p-n-n-p, respectively. Further, although the misalignment (302) represents same amount of misalignments for both the p-type and n-type regions, the p-type region and the n-type region may have different amount of misalignment.

FIG. 3 shows a method flowchart in accordance with one or more embodiments. In one or more embodiments, the method may be used to fabricate the optoelectronic integrated circuit and/or the optical modulator circuit depicted in FIGS. 1.1 and 1.2 above. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, in Step 311, a first BBJC and a second BBJC are formed conforming to a BBJC fabrication pattern. In particular, one or more lithographic masks are used to form the first BBJC and the second BBJC according to a same doping type sequence. Further, the one or more lithographic masks dispose a first APNJ and first BPNJ of the first BBJC, and a second APNJ and second BPNJ of the second BBJC along a same direction. Accordingly, the first BBJC and the second BBJC have the same electrical connection sequence (i.e., pnnp sequence or nppn sequence).

In Step 312, the first BBJC and second BBJC are replicated. In one or more embodiments, the replicated BBJCs are disposed along one or more linear sections.

In Step 313, a third BBJC and a fourth BBJC are formed conforming to the BBJC fabrication pattern. In particular, one or more lithographic masks are used to form the third BBJC and the fourth BBJC according to different (e.g., opposite) doping type sequences. Further, the one or more lithographic masks dispose metal layer connections such that the third BBJC and the fourth BBJC have the same electrical connection sequence. In addition, the one or more lithographic masks dispose (i) the first APNJ and the second BPNJ along a first direction, and (ii) the first BPNJ and the second APNJ along a second direction opposite to the first direction.

In Step 314, the third BBJC and fourth BBJC are replicated. In one or more embodiments, the replicated BBJCs are disposed along one or more linear sections. In particular, the replicated third BBJCs have respective APNJs along the first direction, while the replicated fourth BBJCs have respective APNJs along the second direction. In one or more embodiments, the replicated third BBJCs and the replicated fourth BBJCs are disposed in the one or more linear sections based on a pre-determined direction alternating sequence.

In Step 315, a fifth BBJC and a sixth BBJC are formed conforming to the BBJC fabrication pattern. In particular, one or more lithographic masks are used to form the fifth BBJC and the sixth BBJC according to different (e.g., opposite) doping type sequences. Further, the one or more lithographic masks dispose metal layer connections such that the fifth BBJC and the sixth BBJC have different (e.g., opposite) electrical connection sequence. In addition, the one or more lithographic masks dispose (i) the first APNJ and the second BPNJ along a first direction, and (ii) the first BPNJ and the second APNJ along a second direction opposite to the first direction.

In Step 316, the fifth BBJC and sixth BBJC are replicated. In one or more embodiments, the replicated BBJCs are disposed along one or more linear sections. In particular, the replicated fifth BBJCs have respective APNJs along the first direction, while the replicated sixth BBJCs have respective APNJs along the second direction. In one or more embodiments, the replicated fifth BBJCs and the replicated sixth BBJCs are disposed in the one or more linear sections based on a pre-determined direction alternating sequence.

In Step 317, an optical component is formed conforming to an optical component fabrication pattern that superimposes the BBJC fabrication pattern. The optical component fabrication pattern and the BBJC fabrication pattern may be formed in any sequence during the fabrication. In particular, one or more lithographic masks are used to form the optical component that (i) overlaps the aforementioned APNJs to define a first p-type overlap region and a first n-type overlap region, and (ii) overlaps the aforementioned BPNJs to define a second p-type overlap region and a second n-type overlap region. In one or more embodiments, the first p-type overlap region and the second p-type region are substantially same size (e.g., within 10% or other pre-determined amount) independent of a fabrication misalignment amount of the BBJC fabrication pattern with respect to the optical component fabrication pattern. In one or more embodiments, the first n-type overlap region and the second n-type region are substantially same size (e.g., within 10% or other pre-determined amount) independent of the fabrication misalignment amount of the BBJC fabrication pattern with respect to the optical component fabrication pattern. Accordingly, the respective directions of the APNJs and BPNJs reduce an imbalance in the optical component's interaction with the APNJs and BPNJs due to the fabrication misalignment.

As noted above, one or more of the Steps 311-316 may be omitted. In other words, different combinations of the BBJCs depicted in FIGS. 2.1-2.3 may be formed using the one or more lithographic masks. In one or more embodiments, the Steps 311-316 may be performed simultaneously using the same one or more lithographic masks.\

FIGS. 4-11 show examples in accordance with one or more embodiments of the invention. The examples shown in FIGS. 4-11 implement an optical modulator, such as a Mach-Zehnder (MZ) modulator, based on the fabrication pattern diagrams and method flow chart discussed in reference to FIGS. 1.1-1.2, 2.1-2.3, and 3 above. In particular, the components depicted in FIGS. 4-11 according to legend (400) are examples of the like-named components depicted in FIGS. 1.1-1.2 and 2.1-2.3 above. Although not explicitly shown in FIGS. 4-11, RF termination is connected at the end of the transmission line (electrodes A and B). In one or more embodiments, one or more of the modules and elements shown in FIGS. 4-11 may be omitted, repeated, and/or substituted. Accordingly, embodiments of the invention should not be considered limited to the specific arrangements of modules shown in FIGS. 4-11.

FIG. 4 shows the fabrication pattern of a MZ modulator based on the BBJC X (324) and pnnp component (364) depicted in FIG. 2.1 above. In particular, the APNJs and BPNJs of the MZ modulator are physically oriented along the same direction in the two waveguide arms. For example, the p-n junctions of the BBJC X (324) are physically laid out in a n-p-n-p doping type sequence while being electrically connected as a pnnp component. Connections between the APNJs and BPNJs, and connections between the p-n junctions and the RF traveling-wave electrodes may be realized using on-chip metal layers and contact vias. As the n-type overlap regions shift by substantially the same amount (e.g., within 10% or other pre-determined amount) for both waveguide arms under a misalignment of the fabrication masks, both arms have substantially the same size (e.g., within 10% or other pre-determined amount) n-type overlap regions from all BBJCs as a group. Similarly, as the p-type overlap regions shift by substantially the same amount (e.g., within 10% or other pre-determined amount) for both waveguide arms under the misalignment, both arms have substantially the same size (e.g., within 10% or other pre-determined amount) p-type overlap regions from all BBJCs as a group.

FIG. 5 shows the fabrication pattern of a MZ modulator similar to FIG. 4 with the exception that the p-n junctions of each BBJC are physically laid out in a p-n-p-n doping type sequence while being electrically connected as a nppn component.

FIG. 6 shows the fabrication pattern of a MZ modulator based on the BBJC Y (321), BBJC Z (322), pnnp component (361), and pnnp component (362) depicted in FIG. 2.2 above. In particular, the p-n junction's direction in the different segments changes along the length of each modulating arm. For example, the p-n junctions of the BBJC Y (321) are physically laid out in a p-n-n-p doping type sequence and electrically connected as a pnnp component. In this context, the BBJC Y (321) is referred to as a non-inverted segment. In contrast, the p-n junctions of the BBJC Z (322) are physically laid out in an n-p-p-n doping type sequence while being electrically connected as a pnnp component. In this context, the BBJC Z (322) is referred to as an inverted segment. Accordingly, the optical signal propagates in the p-n junctions oriented in one direction (e.g., the BBJC Y (321) of the non-inverted segment) over half of the arm's length, and propagates in the p-n junctions oriented in the opposite direction (e.g., the BBJC Z (322) of the inverted segment) over the remaining half. As a result of the opposite directions, the effect induced by the misalignment in a non-inverted segment is compensated by an opposite effect induced in a corresponding inverted segment.

As shown in FIG. 6, the p-type region of each top diode (diode overlapped by the top arm) is connected to the electrode A for both the non-inverted and inverted segments, and the p-type region of each bottom diode (diode overlapped by the bottom arm) is connected to the electrode B for both the non-inverted and inverted segments. The MZ modulator may also be implemented using nppn BBJCs where the n-type region of each top diode is connected to the electrode A for both the non-inverted and inverted segments, and the n-type region of each bottom diode is connected to the electrode B for both the non-inverted and inverted segments.

FIG. 7 shows the fabrication pattern of a MZ modulator based on the BBJC Y (321), BBJC W (323), pnnp component (361), and nppn component (363) depicted in FIG. 2.3 above. In particular, the p-n junction's direction in the different segments changes along the length of each modulating arm. For example, the p-n junctions of the BBJC Y (321) are physically laid out in a p-n-n-p doping type sequence and electrically connected as a pnnp component. In this context, the BBJC Y (321) is referred to as a non-inverted segment. In contrast, the p-n junctions of the BBJC W (323) are physically laid out in a n-p-p-n doping type sequence while being electrically connected as a nppn component. In this context, the BBJC W (323) is referred to as an inverted segment. Accordingly, the optical signal propagates in the p-n junctions oriented in one direction (e.g., the BBJC Y (321) of the non-inverted segment) over half of the arm's length, and propagates in the p-n junctions oriented in the opposite direction (e.g., the BBJC W (323) of the inverted segment) over the remaining half. As a result of the opposite directions, the effect induced by the misalignment in a non-inverted segment is compensated by an opposite effect induced in a corresponding inverted segment.

As shown in FIG. 7, for the non-inverted segments, the p-type region of each top diode (diode overlapped by the top arm) is connected to the electrode A and the p-type region of each bottom diode (diode overlapped by the bottom arm) is connected to the electrode B. In contrast, for the inverted segments, the n-type region of each top diode (diode overlapped by the top arm) is connected to the electrode B and the n-type region of each bottom diode (diode overlapped by the bottom arm) is connected to the electrode A. This is referred to as a hybrid pnnp/nppn SPP configuration. The MZ modulator may also be implemented using the opposite structure (i.e., hybrid nppn/pnnp SPP configuration). In the hybrid pnnp/nppn SPP configuration, the BBJC Y (321) is physically laid out in a p-n-n-p doping type sequence and electrically connected as a pnnp component. In contrast, the BBJC W (323) is physically laid out in a n-p-p-n doping type sequence while being electrically connected as a nppn component.

The hybrid pnnp/nppn or nppn/pnnp SPP configuration uses two bias voltages (i.e., bias voltage A, bias voltage B) to polarize the p-n junctions to operate in the depletion mode (reverse bias operation). The use of separate bias voltages may be advantageous in providing an additional parameter to optimize the modulator performances (e.g., frequency response, phase modulation imbalance, etc.).

The hybrid pnnp/nppn or nppn/pnnp SPP configuration allows the diodes to be connected in series using a common doped region (e.g., n-type region for the pnnp segments and p-type region for the nppn segments). Metal layers and contact vias may be used to make the required connections to the proper doped regions and traveling-wave RF electrodes. Bias voltages may also be brought to polarize the p-n junctions using appropriate metal layers and contact vias.

The hybrid pnnp/nppn or nppn/pnnp SPP configuration leads to a symmetric operation around ground voltage, with the use of the differential modulating signal having a DC component of 0V and bias voltages.+−.Vb that are symmetric around ground voltage.

The MZ modulators depicted in FIGS. 6 and 7 above achieve equal phase modulation efficiency in the two MZ modulator arms by inverting half the p-n junctions along the length of the waveguide arms. The inverted and non-inverted p-n junctions may be placed in any order (referred to as the direction alternating sequence) along the waveguide arm's length. FIG. 8 shows the fabrication pattern of a variation of the optical modulator circuit depicted in FIGS. 6 and 7 above. As shown in FIG. 8, the non-inverted and inverted segments may be laid out in a different direction alternating sequence along the length of the waveguides as compared to FIGS. 6 and 7 above. Also, there may be different number of non-inverted and inverted segments to achieve an imbalanced operation. The proportion may be set to any number based on the desired amount of imbalance in the modulation efficiency of the two MZ modulator arms. Further, the bias voltage may be brought to the BBJC segments from any direction depending on the physical layout consideration, such as shown in FIG. 9. Specifically, FIG. 9 shows an example of routing variation in the bias voltages for the optical modulator circuit with the pnnp/nppn hybrid SPP.

Figure 10:
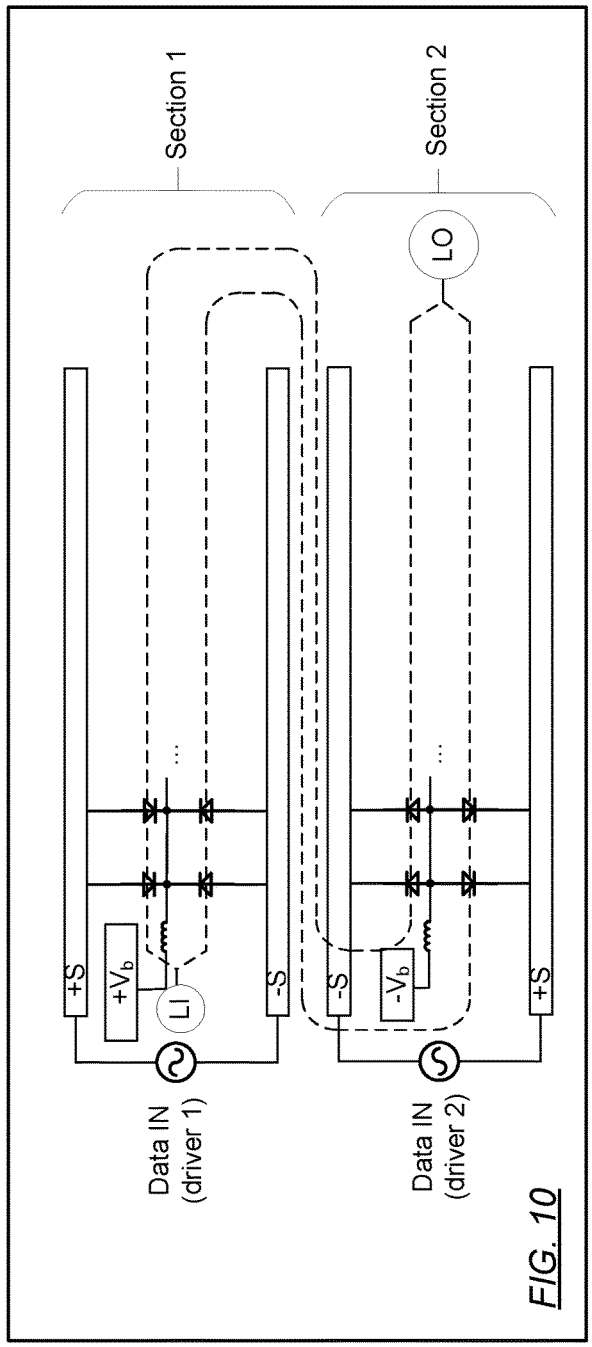

FIG. 10 shows the fabrication pattern of an example two-section optical modulator circuit having multiple segments in each section according to legend (400). In particular, the section 1 includes pnnp BBJCs and the driver polarity is such that the top electrode is connected to the +S terminal of the driver 1 while the bottom electrode is connected to the −S terminal of the driver 1. In the section 2, the direction of the p-n junctions is reversed (to cancel the impact of mask misalignment) for nppn BBJCs. In order to not to cancel the phase modulation imparted to the optical signal in the section 1, the driver polarity for the driver 2 is reversed. In other words, the top electrode in the section 2 is connected to the −S terminal of the driver 2 and the bottom electrode is connected to the +S terminal of the driver 2.

Figure 11:
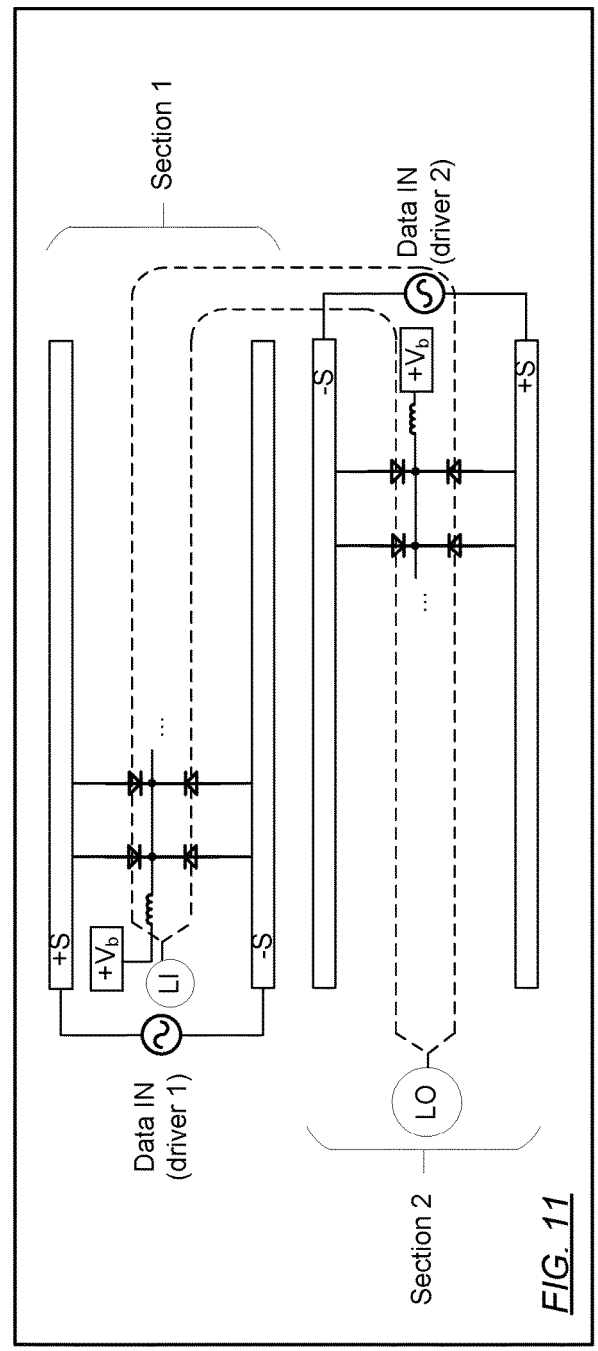

In the configuration described above, the driver polarity is adjusted to cancel the imbalance caused by p-n junction misalignments. Specifically, the top waveguide in section 1 remains the top waveguide in section 2 to cancel the imbalance caused by mask misalignment. FIG. 11 shows the fabrication pattern in a variation of FIG. 10 where the driver 2 is disposed at the opposite side to the driver 1. In the variation, the top waveguide in section 1 becomes the bottom waveguide in section 2. To cancel the imbalance caused by mask misalignment, the p-n junction direction is maintained the same in both waveguides. In other words, both section 1 and section 2 use the pnnp SPP configuration. However, in order not to cancel the phase modulation imparted to the optical signal in the section 1, the driver polarity for the driver 2 is reversed. In other words, the top electrode is connected to the −S terminal of the driver 2 and the bottom electrode is connected to the +S terminal of the driver 2.

Although a RF traveling-wave electrode is described in the examples of FIGS. 4-11 above, the invention may equally apply to a N-section optical modulator circuit driven by N drivers where each section may be based on a lumped element (e.g., an electrode with a single segment containing two p-n junctions in a SPP configuration). The p-n junction directions over the optical waveguides and the connection of the SPP lumped segments to the drivers may be configured to cancel the imbalance in the modulation efficiency caused by mask alignment using the principles described above.

Although a reverse bias operation of the p-n junction is described in the examples above, the invention may equally apply to the p-n junctions in forward bias operation, such as used in forward conduction or in current injection.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical modulator comprising:
   a first arm and a second arm of an optical component, each arm includes an arrangement with an equal amount of p-doped material and an equal amount of n-doped material, wherein the arrangement of each arm is configured such that misalignment with a division line of p-n junctions overlapped by the optical component, resulting from mask misalignment, causes a same effect in both arms; and
   each arm overlapping with a plurality of segments and electrodes connect to the plurality of segments for push-pull operation of the first arm and the second arm.

2. The optical modulator of claim 1, wherein the optical component comprises a pattern of at least one of semiconductor, oxide, and metal formed on at least one of a wafer, die, and chip that superimposes fabrication patterns of the plurality of segments.

3. The optical modulator of claim 1, wherein each segment of the plurality of segments includes a p-n junction overlapped by a corresponding one of the first arm and the second arm.

4. The optical modulator of claim 3, wherein each arm overlaps with multiple p-n junctions resulting in each arm including the equal amount of p-doped material and the equal amount of the n-doped material independent of the misalignment of the multiple p-n junctions with the division line.

5. The optical modulator of claim 3, wherein corresponding segments overlapped by the first arm and the second arm respectively are back-to-back junction components, the back-to-back junction components including one of a pnnp and a nppn configuration.

6. The optical modulator of claim 5, wherein the back-to-back junction components are separated by a non-doped region.

7. The optical modulator of claim 1, wherein corresponding segments overlapped by the first arm and the second arm respectively are back-to-back junction components.

8. An optical modulator circuit comprising:
   a plurality of p-n junction segments; and
   an optical component including a first arm and a second arm overlapping with corresponding segments of the plurality of p-n junction segments, the optical component including an arrangement where the first arm and the second arm include an equal amount of p-doped material and an equal amount of n-doped material, wherein the arrangement is configured such that misalignment with a division line of p-n junctions overlapped by the optical component, resulting from mask misalignment, causes a same effect in both the first arm and the second arm,
   wherein electrodes connect to the plurality of p-n junction segments for push-pull operation of the first arm and the second arm.

9. The optical modulator circuit of claim 8, wherein the optical component comprises a pattern of at least one of semiconductor, oxide, and metal formed on at least one of a wafer, die, and chip that superimposes fabrication patterns of the plurality of p-n junction segments.

10. The optical modulator circuit of claim 8, wherein each segment of the plurality of p-n junction segments includes a p-n junction overlapped by a corresponding one of the first arm and the second arm.

11. The optical modulator circuit of claim 10, wherein each arm overlaps with multiple p-n junctions resulting in each arm including the equal amount of p-doped material and the equal amount of the n-doped material independent of the misalignment of the multiple p-n junctions with the division line.

12. The optical modulator circuit of claim 10, wherein corresponding segments overlapped by the first arm and the second arm respectively are back-to-back junction components, the back-to-back junction components including one of a pnnp and a nppn configuration.

13. The optical modulator circuit of claim 12, wherein the back-to-back junction components are separated by a non-doped region.

14. The optical modulator circuit of claim 8, wherein corresponding segments overlapped by the first arm and the second arm respectively are back-to-back junction components.

15. A method for forming an optical modulator circuit comprising:
   forming a plurality of p-n junction segments to align p-n junctions of the p-n junction segments with a division line;
   forming an optical component including a first arm and a second arm to overlap with corresponding segments of the plurality of p-n junction segments, wherein the optical component is formed with an arrangement where the first arm and the second arm include an equal amount of p-doped material and an equal amount of n-doped material, wherein the arrangement is configured such that misalignment with the division line of the p-n junctions overlapped by the optical component, resulting from mask misalignment, causes a same effect in both the first arm and the second arm, wherein electrodes connect to the plurality of p-n junction segments for push-pull operation of the first arm and the second arm.

16. The method of claim 15, wherein forming the optical component includes forming a pattern of at least one of semiconductor, oxide, and metal formed on at least one of a wafer, die, and chip that superimposes fabrication patterns of the plurality of p-n junction segments.

17. The method of claim 15, wherein each segment of the plurality of p-n junction segments includes a p-n junction overlapped by a corresponding one of the first arm and the second arm.

18. The method of claim 17, wherein each arm is formed to overlap with multiple p-n junctions resulting in each arm including the equal amount of p-doped material and the equal amount of the n-doped material independent of the misalignment of the multiple p-n junctions with the division line.

19. The method of claim 17, wherein corresponding segments overlapped by the first arm and the second arm respectively are formed as back-to-back junction components, the back-to-back junction components including one of a pnnp and a nppn configuration.

20. The method of claim 19, wherein the back-to-back junction components are separated by a non-doped region formed therebetween.

* * * * *